US007183542B2

(12) United States Patent
Mordehai

(10) Patent No.: US 7,183,542 B2
(45) **Date of Patent: *Feb. 27, 2007**

(54) TIME OF FLIGHT ION TRAP TANDEM MASS SPECTROMETER SYSTEM

(75) Inventor: Alex Mordehai, Loveland, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/116,800

(22) Filed: Apr. 27, 2005

(65) Prior Publication Data

US 2005/0194529 A1 Sep. 8, 2005

Related U.S. Application Data

(63) Continuation of application No. 10/314,409, filed on Dec. 6, 2002, now Pat. No. 6,914,242.

(51) Int. Cl.
*B01D 59/44* (2006.01)

(52) U.S. Cl. ...................... 250/287; 250/282; 250/288; 250/292

(58) Field of Classification Search ................. 250/287
See application file for complete search history.

(56) References Cited

U.S. PATENT DOCUMENTS

| | | | | |
|---|---|---|---|---|
| 5,179,278 | A | 1/1993 | Douglas | |
| 5,569,917 | A | 10/1996 | Buttrill, Jr. et al. | |
| 5,729,014 | A | 3/1998 | Mordehai et al. | |
| 5,747,801 | A | 5/1998 | Quarmby et al. | |
| 5,763,878 | A | 6/1998 | Franzen | |
| 5,811,800 | A | 9/1998 | Franzen et al. | |
| 5,825,026 | A | 10/1998 | Baykut | |
| 6,011,259 | A | 1/2000 | Whitehouse et al. | |
| 6,040,075 | A | 3/2000 | Adcock et al. | |
| 6,107,623 | A | 8/2000 | Bateman et al. | |
| 6,111,250 | A | 8/2000 | Thomson et al. | |
| 6,222,185 | B1 | 4/2001 | Speakman et al. | |
| 6,285,027 | B1 | 9/2001 | Chernushevich et al. | |
| 6,403,953 | B2 | 6/2002 | Whitehouse et al. | |
| 6,570,151 | B1 * | 5/2003 | Grosshans et al. | 250/282 |
| 6,621,073 | B1 | 9/2003 | Dresch | |
| 6,621,074 | B1 | 9/2003 | Vestal | |
| 6,627,883 | B2 * | 9/2003 | Wang et al. | 250/292 |
| 2002/0117616 | A1 | 8/2002 | Vestal | |
| 2003/0141449 | A1 | 7/2003 | Wells et al. | |

FOREIGN PATENT DOCUMENTS

| | | | |
|---|---|---|---|
| EP | 1006559 | A2 | 6/2000 |
| WO | WO 00/77822 | A2 | 5/2000 |
| WO | WO 00/77823 | A2 | 6/2000 |

* cited by examiner

*Primary Examiner*—David A. Vanone
*Assistant Examiner*—Phillip A Johnston

(57) ABSTRACT

Apparatus for delivering ions to a mass analyzer. The apparatus includes a time of flight ion guide, a pulsing device for receiving a continuous ion stream containing ions of different atomic mass and for delivering pulses of ions to the ion guide wherein ions in each of the pulses of ions exit the ion guide in ascending order of their atomic mass, and a gating device at the exit end of the ion guide for allowing ions of a predetermined atomic mass to pass to the mass analyzer.

20 Claims, 7 Drawing Sheets

TIME OF FLIGHT ION TRAP TANDEM MASS SPECTROMETER SYSTEM

CROSS-REFERENCE TO RELATED APPLICATIONS

NOT APPLICABLE

STATEMENT REGARDING FEDERALLY SPONSORED RESEARCH OR DEVELOPMENT

This invention has been created without the sponsorship or funding of any federally sponsored research or development program.

FIELD OF THE INVENTION

This invention relates to the field of mass spectrometry. More particularly, it relates to the field of tandem mass spectrometry.

BACKGROUND OF THE INVENTION

In the field of tandem mass spectrometry, it is common to use different kinds of mass analyzers and mass filters in series to improve analytical performance of the combined system. However coupling between different mass analyzers is not always technically easy or even possible. The most common combinations of the mass analyzers are triple quadrupole instruments, where two linear quadrupole filters are connected by a collision cell positioned in-between. An efficient way to couple linear quadrupole, collision cell and a time of flight (TOF) analyzer is disclosed in EP1006559. Magnetic and electric sector analyzers are also commonly used in tandem. These instruments are typically expensive, free standing instruments. Several systems have been recently developed to couple an ion trap with a time of flight mass analyzer. For example, U.S. Pat. No. 5,569,917 describes a combination of an ion trap followed by time of flight mass analyzer. However, the resulting combination is characterized by substantially increased cost and the necessity to operate time of flight at very high energy to obtain reasonable accuracy and resolution of analysis readings.

In another tandem mass spectrometry system, the time of flight mass analyzer was coupled with a quadrupole collision cell followed by a second time of flight analyzer, see WO 0077823 and WO 0077822. In this configuration, it was possible to achieve fragmentation information for the molecule of interest using two time of flight mass analyzers. Like previous systems the final configuration is somewhat expensive and bulky.

In still another tandem mass spectrometry system, two linear quadrupoles were connected by a placing ion trap mass analyzer in-between (Kofel. P.; Peinhard, H.; Schlunegger, U.; Org. Mass Spectrum., 1991, 26, 463). This mass spectrometer system contained two precisionly machined quadrupoles. This results in a complex and expensive system with moderate performance, with the difficulty of coupling an ion beam from a quadrupole mass filter to an ion trap mass analyzer. These and other difficulties experienced with the prior art tandem mass spectrometry systems may be obviated by the present invention.

What is needed is an economical and efficient way to select ions of a specific mass range that can be injected into a mass analyzer from a continuous ion source to improve selectivity and sensitivity for the mass spectrometer system.

SUMMARY OF THE INVENTION

Apparatus for and method of delivering ions to a mass analyzer. The apparatus includes a time of flight ion guide, a pulsing device for receiving a continuous ion stream containing ions of different atomic mass and for delivering pulses of ions from the continuous stream of ions into the entrance end of the ion guide so that ions in each pulse reach the exit end of the ion guide in ascending order of their atomic mass, and a gating device at the exit end of the ion guide operating in timed sequence with the pulsing device for allowing only ions of a predetermined atomic mass in each pulse to pass through the gating device to the mass analyzer. The invention also includes a mass spectrometer that includes the apparatus for delivering ions described above.

BRIEF DESCRIPTION OF THE DRAWINGS

The character of the invention, however, may be best understood by reference to one of its structural forms, as illustrated in the accompanying drawings, in which.

DETAILED DESCRIPTION OF THE INVENTION

Figure 1:
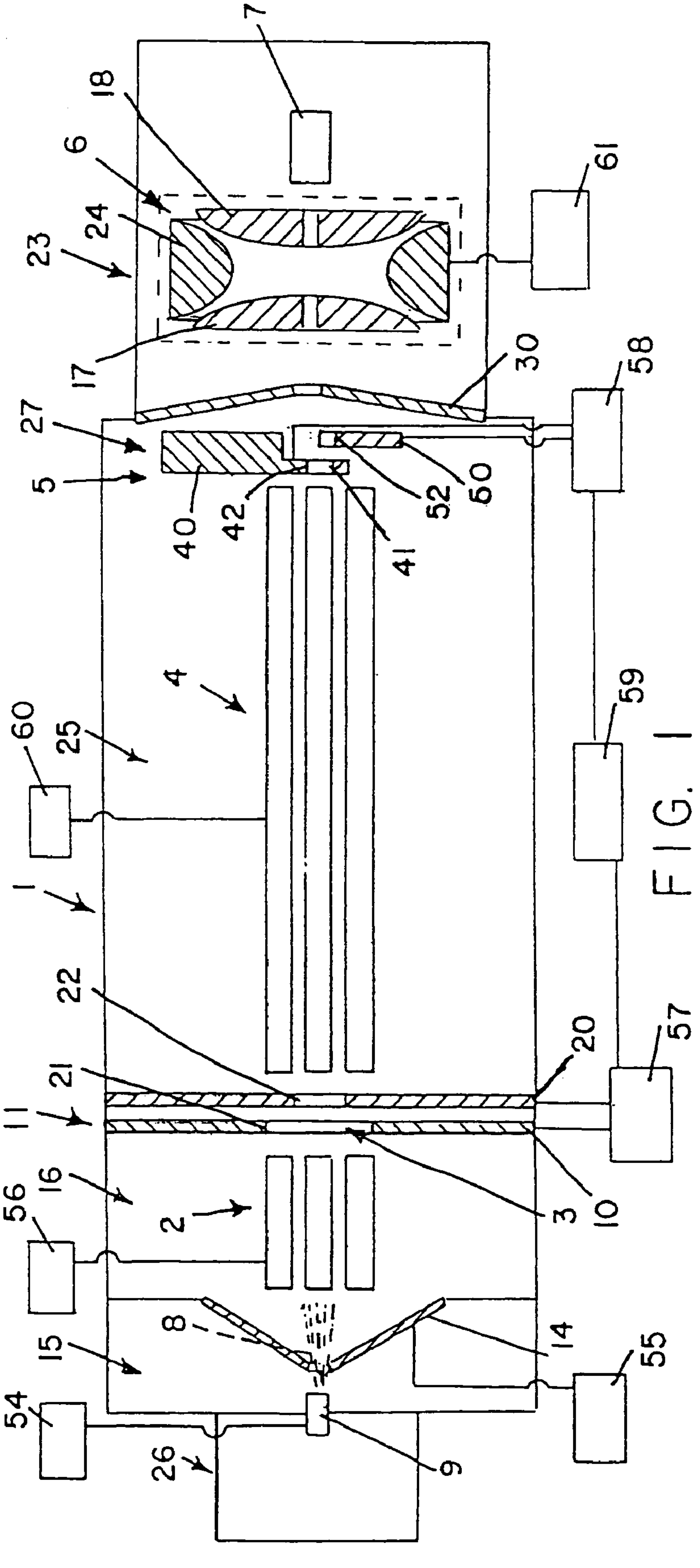
FIG. 1 is a diagrammatic view of a example of an ion delivery system of the present invention applied to an ion trap mass spectrometer.

Referring to FIG. 1, an example is shown of a mass spectrometer system incorporating the present invention including of an ion source, generally indicated by the reference numeral 26, a linear time of flight mass separator, generally indicated by the reference numeral 1 and a quadrupole ion trap mass analyzer, generally indicated by the reference numeral 6. The time of flight mass separator 1 comprises a first or preliminary ion guide, generally indicated by the reference numeral 2, a second ion guide, generally indicated by the reference numeral 4, a gating device, generally indicated by the reference numeral 5, and an ion trap entrance lens, generally indicated by the reference numeral 30. A pulsing device, generally indicated by the reference numeral 11, is located between ion guides 2 and 4 and defines an ion pulse region, generally indicated by the reference numeral 3. The first ion guide 2 may be a radio frequency (RF) ion guide, or it may be any other type of ion guide, such as, by way of example and not limitation, a direct current (DC) ion guide, a stacked ring ion guide or an ion lens system. If it is an RF or a DC guide, it may comprise a multipole structure. Similarly, the second ion guide 4 may be any type of ion guide, with examples similar to those given for ion guide 2. In some exemplary systems incorporating the invention, first ion guide 2 may be omitted.

The ion source 26 may be any ion source known in the art that can be used for generating ions from an analyte sample and delivering them to a mass spectrometer system.

Examples include atmospheric pressure ionization (API) sources, such as electrospray (ESI), atmospheric pressure chemical ionization (APCI) and atmospheric pressure photoionization (APPI) sources. The analyte sample may be in liquid or gas form, for example, and is introduced into the ion source 26 by means well known in the art. The ion source 26 communicates with an interface 9 that comprises functions of transmitting ions from the ion source 26 to the mass spectrometer system and, optionally, allowing a reduction of gas pressure from that of the ion source 26 to that of the mass spectrometer system. Interface 9 may be an orifice, a capillary, a tube, a passageway or any other such device for ion transport and, optionally, pressure reduction.

The exemplary mass spectrometer system comprises one or more vacuum chambers, for example chambers 15, 16 and 25 shown in FIG. 1, that may optionally be separately pumped by vacuum pumps (not shown). In FIG. 1, an optional skimmer 14 is shown dividing chamber 15 and 16, the first ion guide 2 is shown within chamber 16, and second ion guide 4 is shown as located within chamber 25. The quadrupole ion trap mass analyzer 6 comprises a quadrupole ion trap, generally indicated by the reference number 23, and an ion detector 7. The quadrupole ion trap comprises end cap electrodes 17 and 18 and a ring electrode 24.

The various components of the mass spectrometer system shown in FIG. 1, such as the interface 9, skimmer 14, ions guide 2 and 4, pulsing device 11, and lens 30, gating device 5 and ion trap 23 are connected to conventional electrical power sources and controls in a manner well known in the art of mass spectrometers to produce the electrical potential, voltages, and timing described in the example of systems described in this application.

The power supplies for each of the electrical components of the exemplary mass spectrometer system of the present invention are shown diagrammatically in FIG. 1. The power to interface 9 is indicated by block 54. The power supply to skimmer 14 and first ion guide 2 are represented by blocks 55 and 56, respectively. The power supply to lenses 10 and 20 are represented by block 57. The power supply to the split lens 27 is represented by block 58. Power supplies 57 and 58 are connected to a master clock represented by block 59 to insure that the lens 27 operates in timed sequence with the operation of the lenses 10 and 20. The power supply, i.e. radio frequency generator, to the second ion guide 4 is represented by block 60. The power supply to the quadrupole ion trap 28 is represented by block 61.

According to the present example of the invention, a continuous beam of ions 8 from the interface 9 pass through the skimmer 14 and enter the first or preliminary ion guide 2. The ions travel along a preliminary ion path through the ion guide 2 and accumulate in the ion pulse region 3. After accumulation, ions are pulsed out into the second ion guide 4, that serves as the free flight region for the time of flight mass separator 1. All of the pulsed ions have substantially the same energy. Therefore, the flight time of ions through the second ion guide 4 depends only on their m/z. The gating device 5 at the exit of the second ion guide operates with a controlled time delay, synchronized with the ion pulse and stays open also for a predetermined period of time. This allows only ions having masses within a selected m/z range to enter the ion trap mass analyzer 23.

Figure 2:
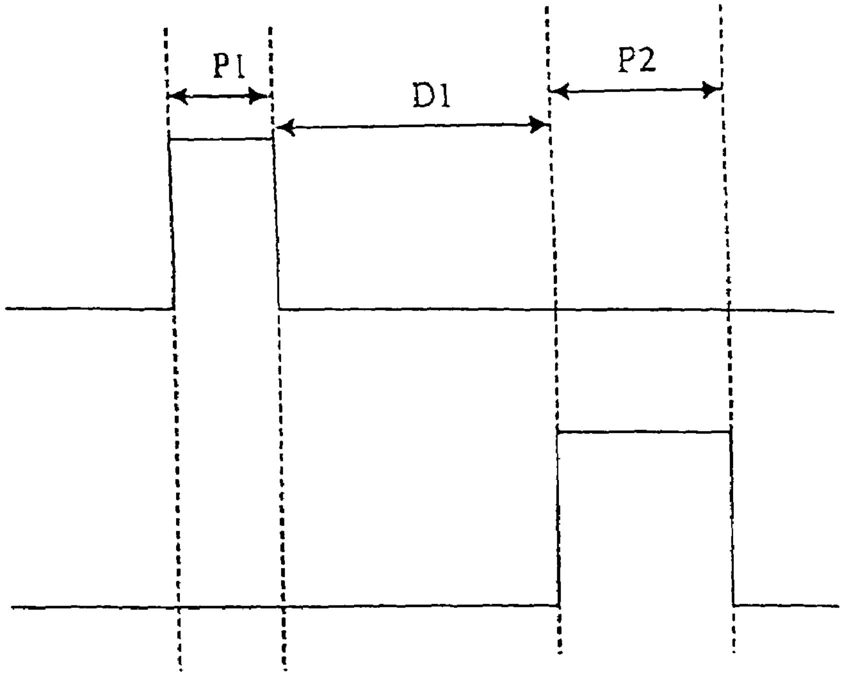
FIG. 2 is an example of a timing diagram for the present invention.

A typical timing diagram for the control pulses is shown in FIG. 2. Ions are typically stored in the ion pulse region during D1 and P2 time intervals, then ions are pulsed out of region 3 during P1 time interval and the process continues in cycles. During the D1 time interval, the pulsed out ions separate in their positions along the longitudinal axis of the second ion guide 4 according their m/z values, while the new portion of ions is accumulated in the ion pulse region 3. The typical time for the pulses P1 is 10 microseconds, while the whole cycle (P1+D1+P2) is 100 microseconds, thus resulting in 10 $kH_z$ repetition rate.

In an example, the first ion guide 2 is an octapole ion guide 25 mm long with 3 mm inscribed diameter. The second ion guide 4 is 260 mm long with the same inscribed diameter as the first ion guide. Both ion guides 2 and 4 operated at 2.2 Mhz, 150 V peak-to-peak radio frequency voltage applied in the usual manner for an octapole RF ion guide. Pulsing device 11 comprises two lenses 10 and 20. Lens 20 has a 3.5 mm ID aperture 22. Lens 10 has an aperture 21 that is substantially larger than aperture 22. The pressure in the pulse region 3 is in the range of about 10 to about $10^{-1}$ mTorr, due to the neutral gas accompanying the ion beam 8 into first ion guide 2. The presence of the neutral gas is useful for the efficient ion accumulation in the pulse region 3. Several DC voltages are applied to the ion optical elements to produce continuous cycles of ion accumulation in the pulse region 3. Ion guide 2 is maintained typically at 1.8V DC, lens 10 at 1V DC, lens 20 is pulsed from 30V DC during ion accumulation to 0V DC during ion pulse out (P1), the second ion guide 4 is maintained at −21V.

Figure 3:
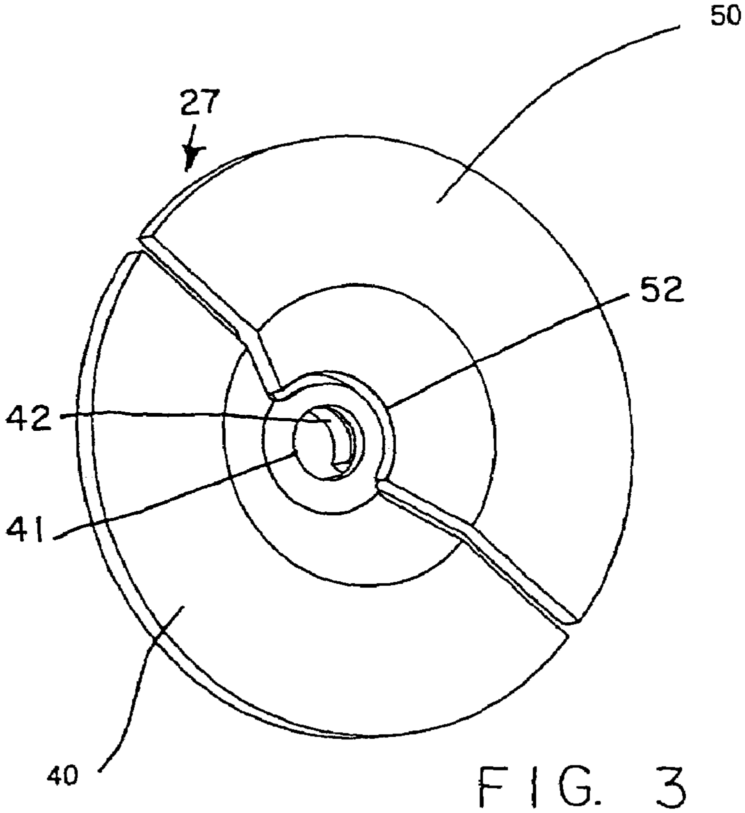
FIG. 3 is an isometric view of a two part ion lens which serves as the ion gating device portion of the present invention.

The gating device 5 is a split lens, generally indicated by the reference numeral 27, shown also in FIG. 3. The split lens 27 is an electric lens comprising a first element 40 and a second element 50. The lens 27 has an aperture 41. A first portion 42 of the aperture 41 is located in the element 40. A second portion 52 of the aperture 41 is located in the element 50. Both lens elements 40 and 50 for the gating device 5 are maintained at the same potential of −5V during (P2) pulse to provide ion transmission for the ions of selected mass range. During the rest of the time, the lens element 50 is switched to −100V to deflect the ion beam. The ion lens 30 serves as a refocusing element to direct the ion beam into the ion trap 23 and is maintained at −70V for the experiments. Refocusing can be accomplished by any number of ion lenses known in the art for example, an aperture lens, a system of aperture lenses, one or more einzle lenses, a dc quadrapole lens system, a cylinder lens or system thereof, or any combination of the above lenses.

Tests with the system of the present invention were performed on a modified Ion Trap MSD instrument from Agilent Technologies, wherein the standard ion optics in the third vacuum chamber were replaced with TOF ion optics as described in the above described example. The standard calibration mix sample from Agilent Technologies (part# G2431A) was introduced through a standard electrospray nebulizer. This sample has several ion species across the complete range of the mass analyzer; with m/z of 118, 322, 622, 922, 1522, and 2122 Da.

Figure 4:
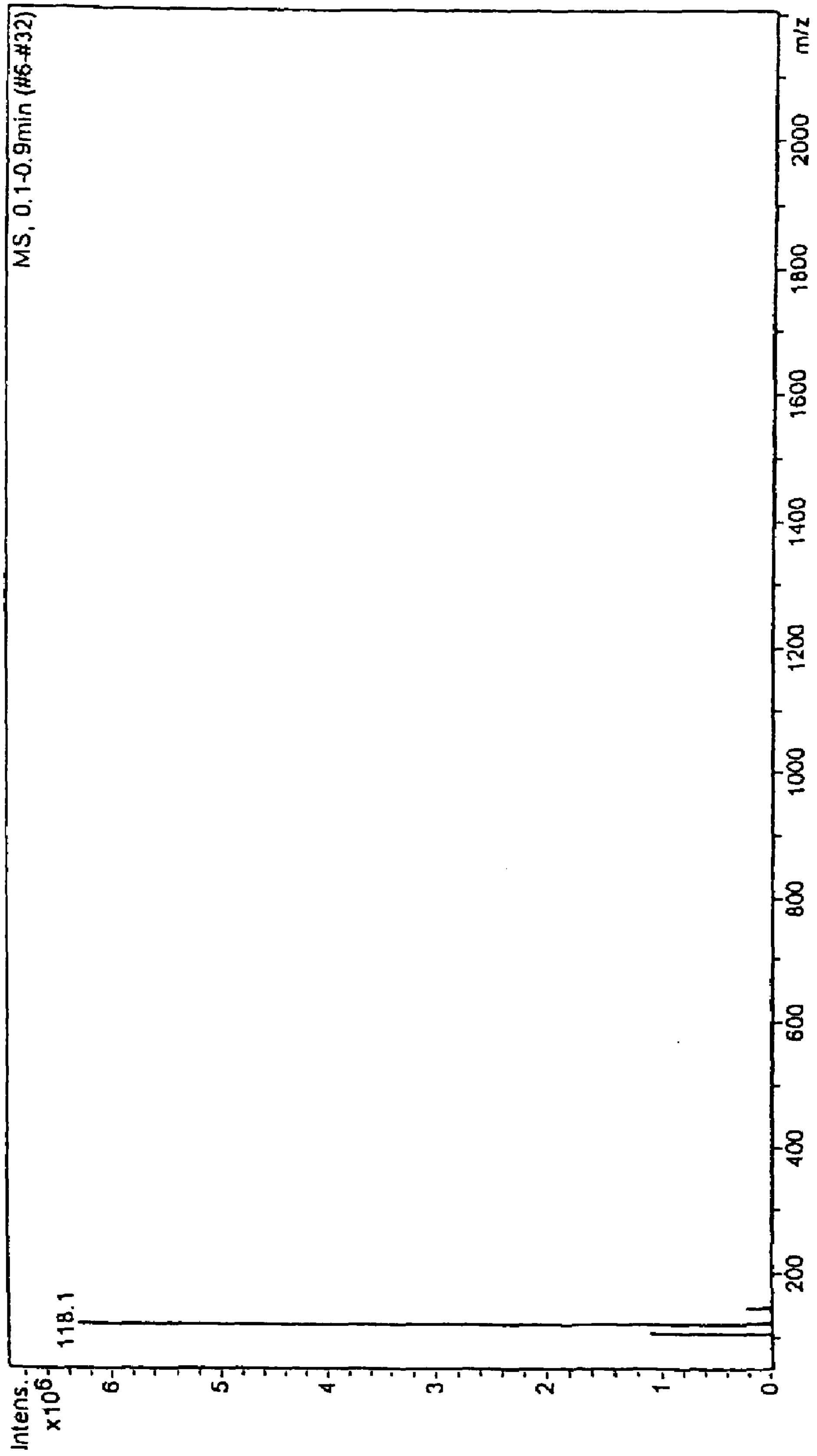
FIGS. 4–7 are mass spectra obtained from an ion trap mass spectrometer, utilizing an ion delivery system of the present invention.

FIG. 4 shows a mass spectrum obtained with P1=10 microseconds, D1=19 microseconds and P2=15 microseconds. Only masses within the mass range from 70 to 250 are selectively injected into the ion trap with the main peak at mass 118 Da.

Figure 5:
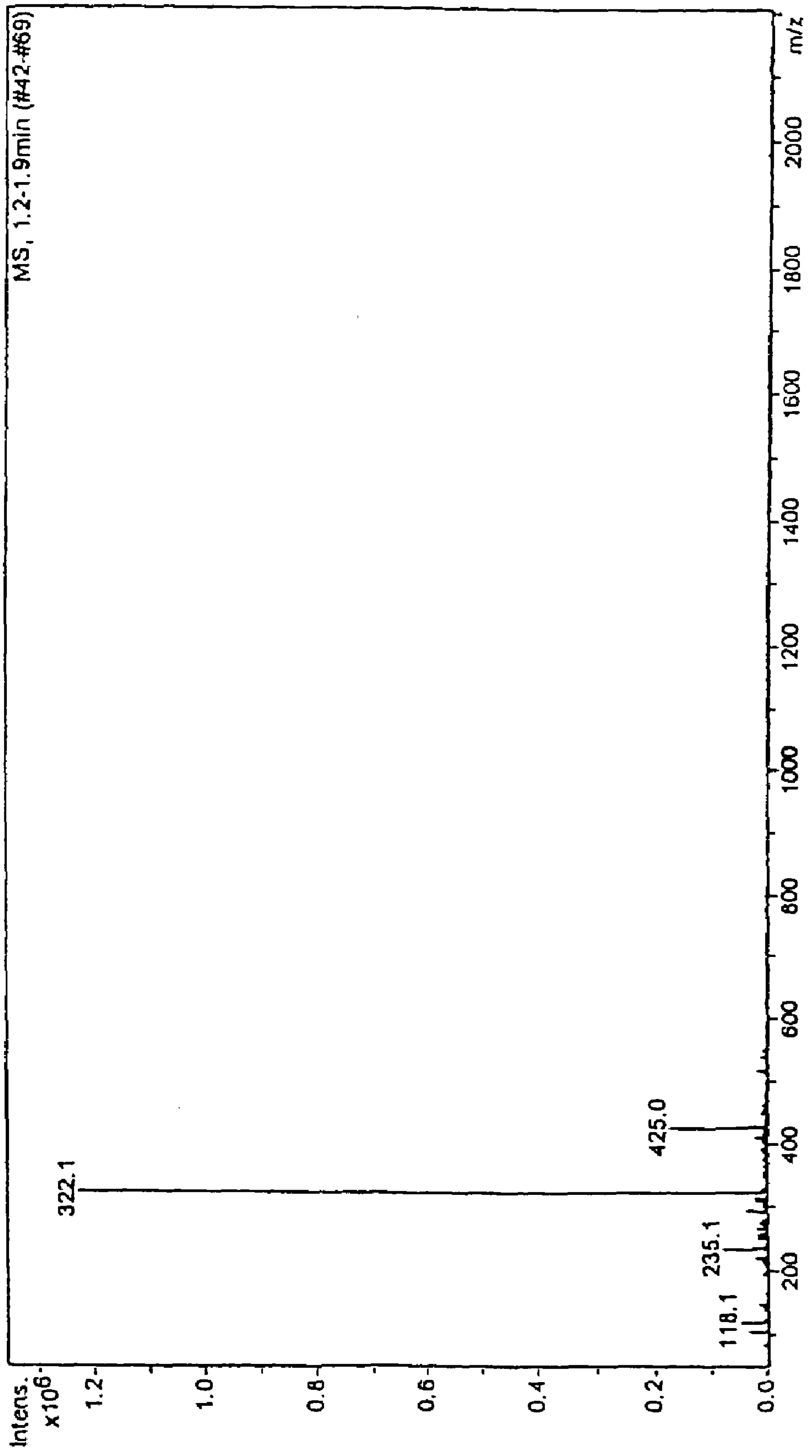

FIG. 5 shows the spectrum obtained at P1=10 microseconds, D1=30 microseconds and P2=15 microseconds. As expected, the increase in the delay time D1 between pulses P1 and P2 shifts the transmitted mass range to the higher m/z values.

Figure 6:
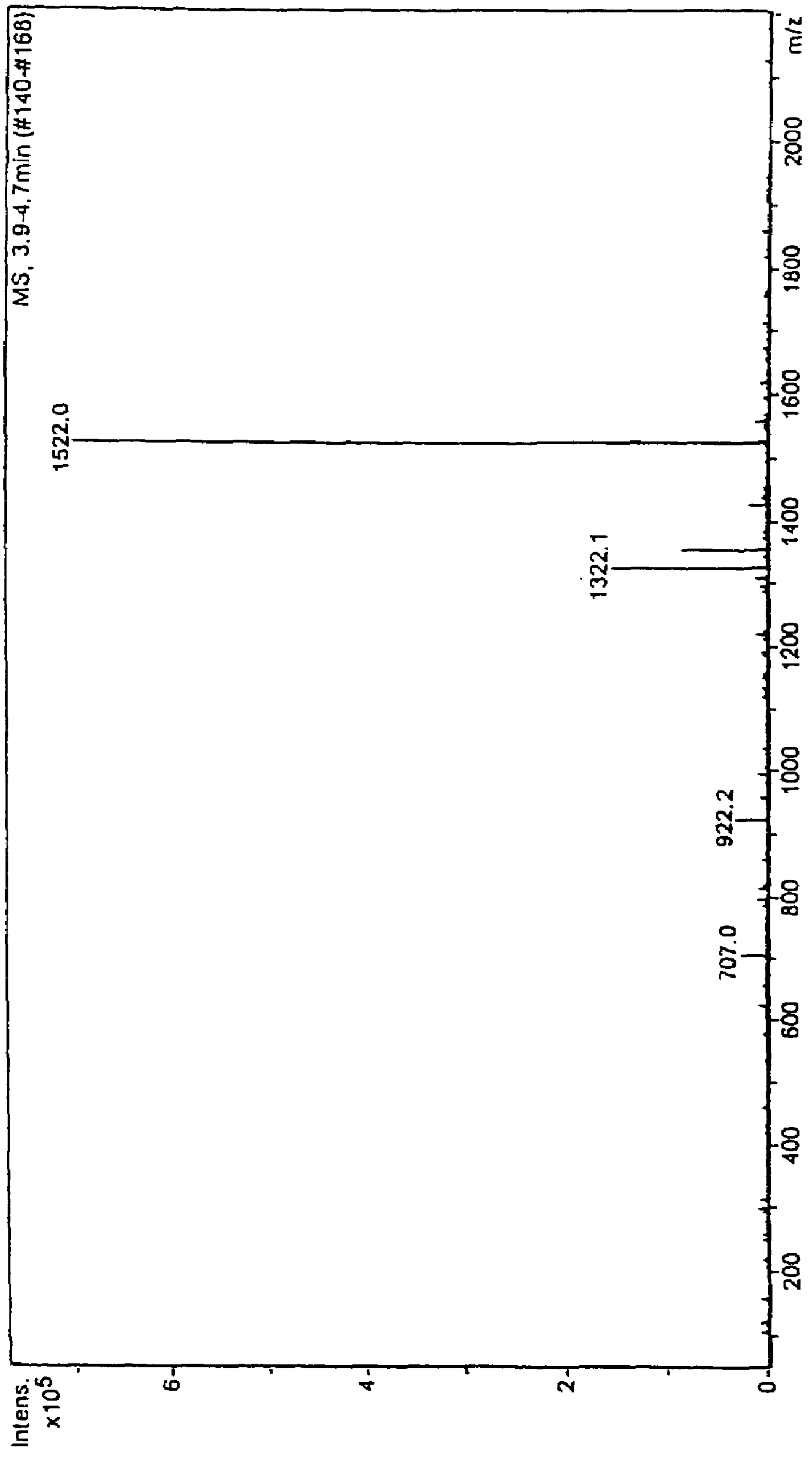

FIG. 6 shows a spectrum with maximum of the transmission window positioned around the m/z 1522 Da peak, which is obtained with P1=10 microseconds, D1=6 microseconds and P2=15 microseconds.

Figure 7:
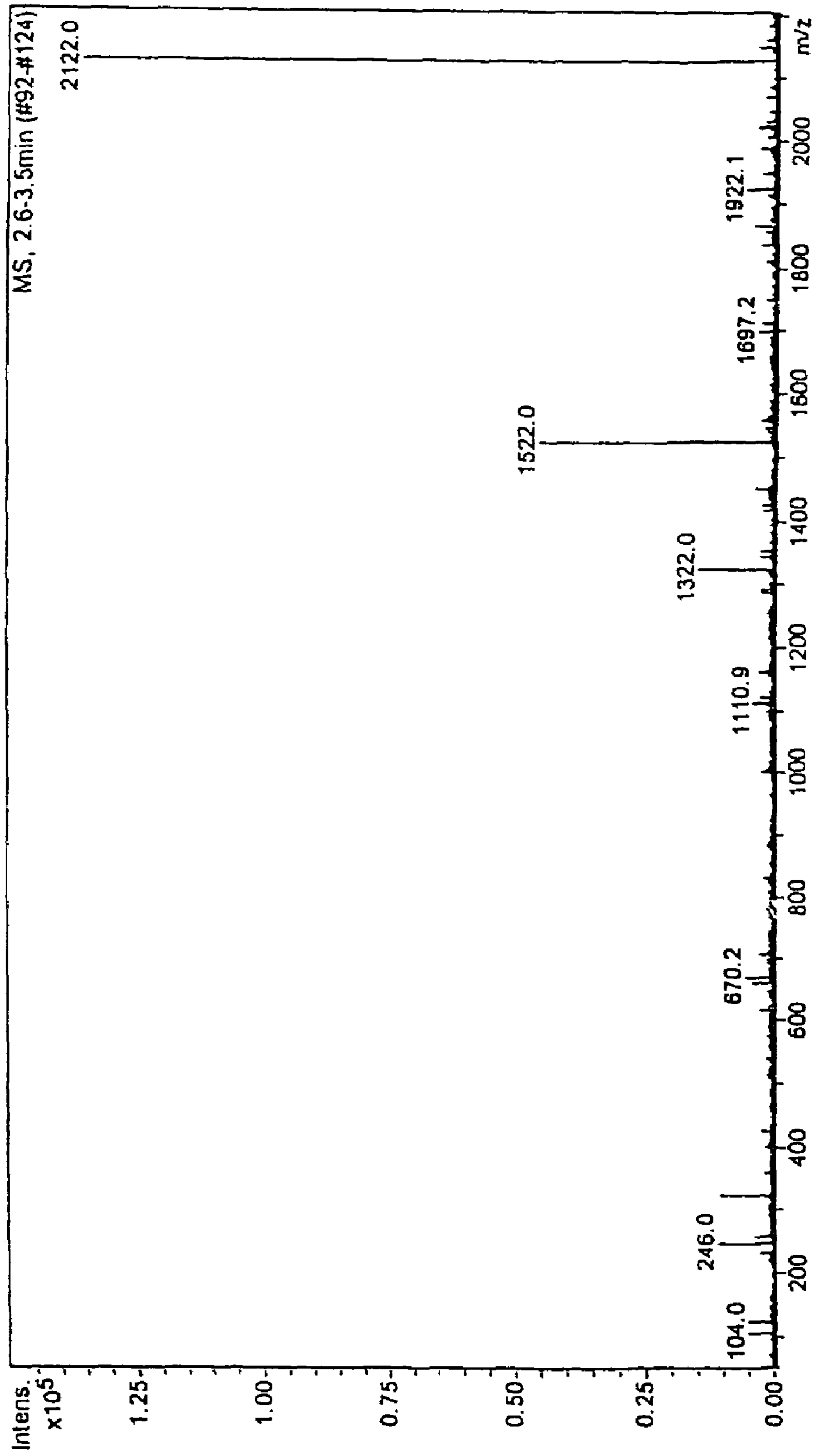

FIG. 7 shows the transmission window positioned around the m/z 2122 Da microseconds peak with P1=10 microseconds, D1=76 microseconds and P2=15 microseconds. All the spectra were obtained with total of 10 time of flight cycles with 100 microseconds duration time for each cycle. For the analytical applications, the optimum number of time of flight cycles injected into the ion trap can be calculated based on the previous scan information. Alternatively, a special short scan can be used to evaluate the number of cycles that are needed during the following main scan to target the same number of ions injected into an ion trap. This short scan can have a small fixed number of ions from time-of-flight cycles injected into an ion trap, with fast scanning of the trap analyzer to evaluate the intensity of the injected beam for the main scan. It is recognized, that it is also beneficial to synchronize the pulse P1 with the phase of the main radio frequency voltage of the ion trap mass analyzer in a way that ions of interest arrive at the ion trap entrance at the most favorable phase for the injection, thus further improving sensitivity for the tandem system. It is also recognized that two or more mass ranges can be selected to transmit ions from within those ranges into an ion trap and to reject ions outside of the selected ranges.

Figure 8:
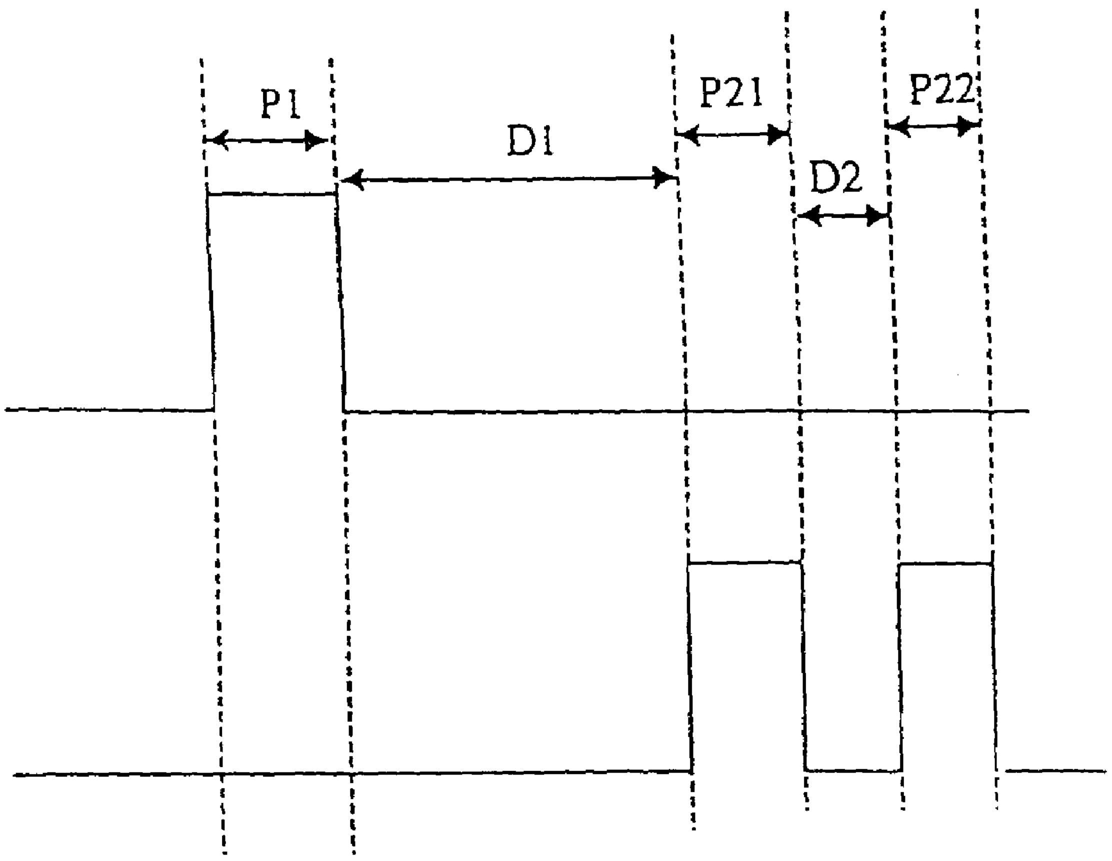
FIG. 8 is an example of a timing diagram for the selection of two mass ranges of ions for injection into the mass spectrometer system.

FIG. 8 shows the timing diagram for the selection of two mass ranges for the injection into the ion trap. Ions are pulsed out from the storage region 3 during the pulse P1. during D1, a new portion of ions are accumulated in the storage region 3, while pulsed out ions are separated in a second ion guide according to their m/z values. The gating device 5 opens twice. In the first opening, the ions in the first mass region first pass during the P21 pulse. After time delay D2, gating device 5 opens a second time to pass ions for the second mass region during the time P22. This mode can be of particular benefit when rejection of a single matrix ion is desired.

Although examples of the invention are described, the invention is not limited to any particular implementation. For example, the radio frequency ion guide can be a quadrupole, hexapole or other multipole device, as well as a structure of rings or a multipole sliced into several segments as is well known in the art. The gating device can be of different geometry and design as well known in the prior art. The ion delivery system of the present invention can be used with different ionization techniques including electrospray, electron impact, etc. The ion delivery system of the present invention operates at relatively low energy and only allows ions within a predetermined mass range to enter the ion trap of quadrupole ion trap mass analyzer. This also may result in improved sensitivity, selectively and signal-to-noise ratio for the mass analyzer.

According to the present invention the time of flight mass separator can operate at unusually low accelerating energy (below several hundred volts), since ions are guided in free flight region by an ion guide (otherwise the ions would disperse). Low ion energy simplifies the design, and also results in small, portable instruments. Another advantage of the device may be high duty cycle (close to 100%), since ions can be accumulated in the ion pulse region for about the same period of time that it takes for the heavier mass of interest to reach the exit of the second ion guide. Also, since virtually no ions are lost during accumulation in the pulsed region, the ion transmission in the selected mass window may be close to 100%. Therefore, the tandem combination of a linear time of flight mass analyzer and an ion trap mass analyzer allows selecting a predetermined mass range to be injected into an ion trap without appreciable losses in the ion intensities. This results in filling the ion trap to capacity only with ions of interest within a specified mass range and rejecting the interfering matrix ions outside of the transmission window, thus improving sensitivity, selectivity and signal to noise ratio for the ion trap mass analyzer.

The invention claimed is:

1. An apparatus for directing ions, comprising:

(a) a time of flight ion guide having an entrance end and an exit end;

(b) a pulsing device at said entrance end of said ion guide for delivering pulses of ions into said ion guide; and (c) a split electric lens at said exit end of said ion guide, said split electric lens comprising: a single lens including first and second overlapping parts each containing a portion of an overlapping aperture, wherein said first and second overlapping parts are mated to form said single lens with a single overlapping aperture, and wherein said first part has a first electric potential and said second part has a second electric potential, said first and second electric potentials are independently controllable to either allow ions to pass through said single overlapping aperture or prevent ions from passing through said single overlapping aperture.

2. The apparatus of claim 1, wherein said split electric lens is operated in timed sequence with said pulsing device.

3. The apparatus of claim 2, wherein said split electric lens selectively allows ions of a pre-determined molecular weight to pass through said split electric lens.

4. The apparatus of claim 1, wherein ions are transmitted through said aperture if said first and second electric potentials are equal.

5. The apparatus of claim 1, wherein ions are not transmitted through said aperture if said first and second electric potentials are different.

6. The apparatus of claim 1, wherein said spilt electric lens is circular in shape.

7. The apparatus of claim 1, wherein said aperture is circular in shape.

8. The apparatus of claim 1, wherein said pulsing device receives a continuous ion stream.

9. The apparatus of claim 1, wherein said ion guide is an RF ion guide.

10. A mass spectrometry system, comprising:

(a) an ion source;

(b) a time of flight ion guide having an entrance end and an exit end;

(c) a pulsing device for delivering pulses of ions from said entrance end of said ion guide;

(d) a split electric lens at said exit end of said ion guide, said split electric lens comprising: a single lens including first and second overlapping parts each containing a portion of an overlapping aperture, wherein said first and second overlapping parts are mated to form said single lens with a single overlapping aperture, and wherein said first part has a first electric potential and said second part has a second electric potential, said first and second electric potentials are independently controllable to either allow ions to pass through said single overlapping aperture or prevent ions from passing through said single overlapping aperture; and (e) a mass analyzer for analyzing mass of ions that pass through said aperture.

11. The mass spectrometry system of claim 10, wherein said split electric lens is operated in timed sequence with said pulsing device.

12. The mass spectrometry system of claim 11, wherein said split electric lens selectively allows ions of a pre-determined molecular weight to pass through said split electric lens.

13. The mass spectrometry system of claim 10, wherein ions are transmitted through said aperture if said first and second electrical potentials are equal.

14. The mass spectrometry system of claim 10, wherein ions are not transmitted through said aperture if said first and second electrical potentials are different.

15. The mass spectrometry system of claim 10, wherein said split electric lens is circular in shape.

16. The mass spectrometry system of claim 10, wherein said aperture is circular in shape.

17. The mass spectrometry system of claim 10, wherein said pulsing device receives a continuous ion stream from said ion source.

18. The mass spectrometry system of claim 10, wherein said ion guide is an RF ion guide.

19. A method of analyzing in a mass spectrometry system, comprising:

a) pulsing ions into a time of flight ion guide having an ion entrance end and ion b) separating said ions on the basis of their atomic mass in said time of flight ion guide;

c) selectively allowing ions of a pre-determined atomic mass to pass through an aperture of a split electric lens positioned at the ion exit end, wherein said split electric lens comprises: a single lens including first and second overlapping parts each containing a portion of an overlapping aperture, wherein said first and second overlapping parts are mated to form said single lens with a single overlapping aperture, and wherein said first part has a first electric potential and said second part has a second electric potential, said first and second electric potentials are independently controllable to either allow ions to pass through said single overlapping aperture or prevent ions from passing through said single overlapping aperture; and d) analyzing said ions of a pre-determined atomic mass in a mass analyzer.

20. The method of claim 19, wherein selected electrical potentials are applied at a selected time to allow ions of a predetermined atomic mass to pass through said aperture.

* * * * *